United States Patent
Kim et al.

(10) Patent No.: US 9,846,647 B2
(45) Date of Patent: Dec. 19, 2017

(54) CACHE DEVICE AND CONTROL METHOD THREREOF

(71) Applicant: SK hynix Inc., Icheon-si Gyeonggi-do (KR)

(72) Inventors: Dong-Gun Kim, Hwaseong-si Gyeonggi-do (KR); Yong-Kee Kwon, Icheon-si Gyeonggi-do (KR); Hong-Sik Kim, Seongnam-si Gyeonggi-do (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 612 days.

(21) Appl. No.: 14/333,185

(22) Filed: Jul. 16, 2014

(65) Prior Publication Data
US 2015/0052310 A1    Feb. 19, 2015

(30) Foreign Application Priority Data

Aug. 16, 2013  (KR) .......................... 10-2013-0097042

(51) Int. Cl.
*G06F 12/00* (2006.01)
*G06F 12/0864* (2016.01)
*G06F 12/0806* (2016.01)
*G06F 12/0897* (2016.01)

(52) U.S. Cl.
CPC ...... *G06F 12/0864* (2013.01); *G06F 12/0806* (2013.01); *G06F 12/0897* (2013.01)

(58) Field of Classification Search
None
See application file for complete search history.

(56) References Cited

U.S. PATENT DOCUMENTS

| | | | | |
|---|---|---|---|---|
| 2007/0094450 A1* | 4/2007 | VanderWiel | .......... | G06F 12/126 711/133 |
| 2007/0233964 A1* | 10/2007 | Robinson | ............ | G06F 12/0864 711/136 |
| 2008/0109606 A1* | 5/2008 | Lataille | .................. | G06F 12/12 711/133 |
| 2013/0191587 A1* | 7/2013 | Torii | ................... | G06F 12/0811 711/105 |
| 2013/0262767 A1* | 10/2013 | Lih | ..................... | G06F 12/0897 711/120 |

FOREIGN PATENT DOCUMENTS

KR    1020117023295 A    3/2010

OTHER PUBLICATIONS

Zahran et al., Non-Inclusion Property in Multi-level Caches Revisited, IJCA, vol. 14, No. 2, Jun. 2007.*
Qureshi, Moinuddin K. et al., "The V-Way Cache : Demand-Based Associativity via Global Replacement", ISCA 05 Proceedings of the 32nd annual international symposium on Computer Architecture, pp. 544-555, Jun. 4-8, 2005, EEE Computer Society, Washington, D.C., USA.

* cited by examiner

*Primary Examiner* — Reginald Bragdon
*Assistant Examiner* — Michael Westbrook
(74) *Attorney, Agent, or Firm* — William Park & Associates Ltd.

(57) ABSTRACT

A cache device may include a first cache including a first set and a plurality of ways corresponding to the first set, and a second cache including a second set and a plurality of ways corresponding to the second set. The second set is related with the first set depending on a vacancy of the ways of the first set.

6 Claims, 6 Drawing Sheets

CACHE DEVICE AND CONTROL METHOD THREREOF

CROSS-REFERENCE TO RELATED APPLICATIONS

The present application claims priority of Korean Patent Application No. 10-2013-0097042, filed on Aug. 16, 2013, which is incorporated herein by reference in its entirety.

BACKGROUND

1. Technical Field

Various embodiments generally relate to a cache device and a control method thereof.

2. Related Art

A cache device is used between a processor and a semiconductor memory device to reduce an access time for the semiconductor memory device.

For example, when a semiconductor memory device having a capacity of 4 GB and a cache device having a capacity of 2 MB are used, 1/2048 of the entire addresses of the semiconductor memory device may be stored in the cache device.

However, when read or write requests are concentrated in a part of the addresses of the semiconductor memory device, data may be frequently evicted from some sets of the cache device, thereby degrading the performances of the cache device and the system including the same.

SUMMARY

In an embodiment, a cache device may include a first cache including a first set and a plurality of ways corresponding to the first set, and a second cache including a second set and a plurality of ways corresponding to the second set, wherein the second set is related with the first set depending on a vacancy of the ways of the first set.

In an embodiment, a system may include a processor core, a storage device, and a cache device coupled between the processor core and the storage device and configured to cache data of the storage device. The cache device may include, a first cache including a first set and a plurality of ways corresponding to the first set, and a second cache including a second set and a plurality of ways corresponding to the second set, wherein the second set is related with the first set depending on a vacancy of the ways of the first set.

In an embodiment, a control method of a cache device may include, determining whether a first way corresponding to a read request address exists in a first set of a first cache, and checking whether a second set related with the first set exists in a second set, when the first way does not exist. The control method of a cache device may also include checking whether a second way corresponding to the read request address exists in the second set, when the second set exists, and reading data of the read request address from the second way, when the second way exists in the second set.

In an embodiment, a control method of a cache device may include checking whether a first way corresponding to a write request address exists in a first set of a first cache, and checking whether a second set related with the first set exists in a second cache, when the first way does not exist. The control method of a cache device may also include checking whether a second way corresponding to the write request address exists in the second set, when the second set exists, and storing the write request data, when the second way exists.

In an embodiment, there is provided a control method of a cache device that may include a first cache including a first set having a plurality of ways and a second cache including a second set which has a plurality of ways and are related with the first set depending on a vacancy of the ways of the first set and storing a count indicating the access frequency of the second set. The control method may include increasing the count of the second set when performing a read or write operation on the second set, and decreasing the count at a predetermined period.

In an embodiment, a cache device may include a first cache comprising a first set and a plurality of ways corresponding to the first set, and a second cache comprising a plurality of second sets and a plurality of ways corresponding to the second set, wherein any one set of the plurality of second sets may be used to expand the first set of the first cache.

In an embodiment, a system may include a processor core, a storage device, and a cache device coupled between the processor core and the storage device and configured to cache data of the storage device. The cache device may include a first cache comprising a first set and a plurality of ways corresponding to the first set, and a second cache comprising a plurality of second sets and a plurality of ways corresponding to the second set, wherein any one set of the plurality of second sets may be used to expand the first set of the first cache.

DETAILED DESCRIPTION

Various embodiments will be described below in more detail with reference to the accompanying drawings. The embodiments may, however, be embodied in different forms and should not be construed as limited to the embodiments set forth herein. Rather, these embodiments are provided so that this disclosure will be thorough and complete, and will fully convey the scope of the embodiments to those skilled in the art. Throughout the disclosure, like reference numerals refer to like parts throughout the various figures and embodiments.

Various embodiments may be directed to a cache device capable of reducing performance degradation even when requests are concentrated on some addresses of a semiconductor memory device, and a control method thereof.

Figure 1:
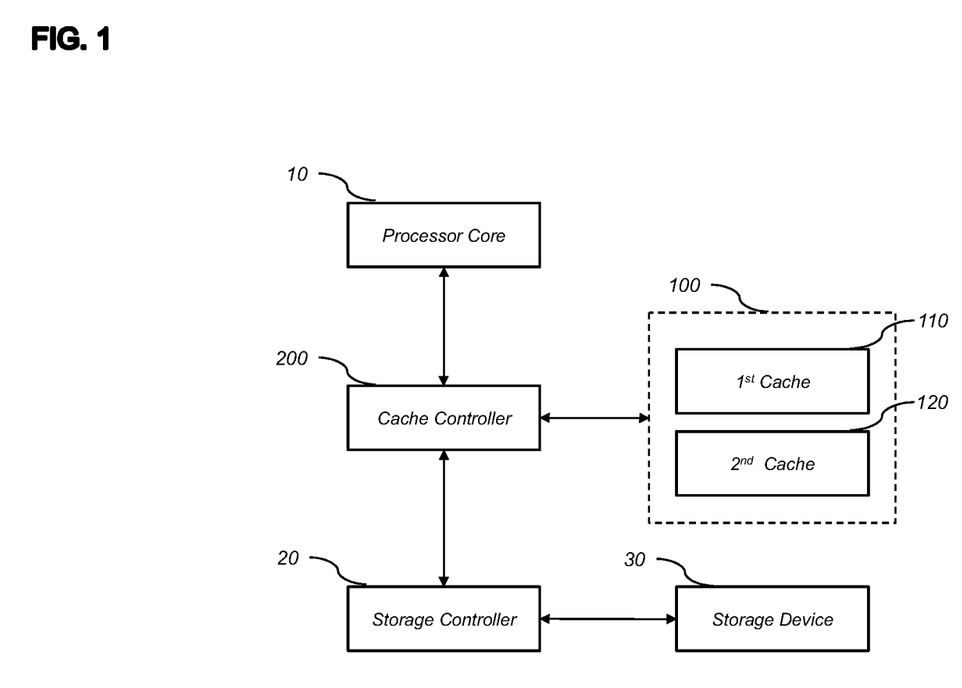
FIG. 1 is a block diagram representation of a system including a cache device in accordance with an embodiment.

FIG. 1 is a block diagram representation of a system including a cache device 100 in accordance with an embodiment.

The cache device may be used between a processor core 10 and a storage device 30, in order to improve the performance of the system. As illustrated in FIG. 1 the cache device 100 is coupled, for example, between the processor core 10 and the storage device 30.

In an embodiment, the storage device 30 may include a volatile semiconductor memory device such as DRAM, a nonvolatile semiconductor memory device such as SSD, a magnetic storage device such as a hard disk, and/or an optical storage device such as an optical disk.

The cache device 100 in accordance with an embodiment may include a first cache 110 and a second cache 120. A cache controller 200 in accordance with an embodiment may perform a control operation for the cache device 100 including the first and second caches 110 and 120.

The cache device 100 in accordance with an embodiment may include the first and second caches 110 and 120.

Each set of the second cache 120 may be related with any one set of the first cache 110. When all ways of a specific set of the first cache 110 are used (i.e., are filled, have no vacancy, or have no vacant way), any one set of the second cache 120 may serve to expand the specific set of the first cache 110.

When requests are concentrated on the specific set of the first cache 110, the second cache 120 may prevent frequent evictions from occurring due to the lack of storage space in the first cache 110.

The cache device 100 and an operating method thereof in accordance with an embodiment will be described in detail.

Figure 2:
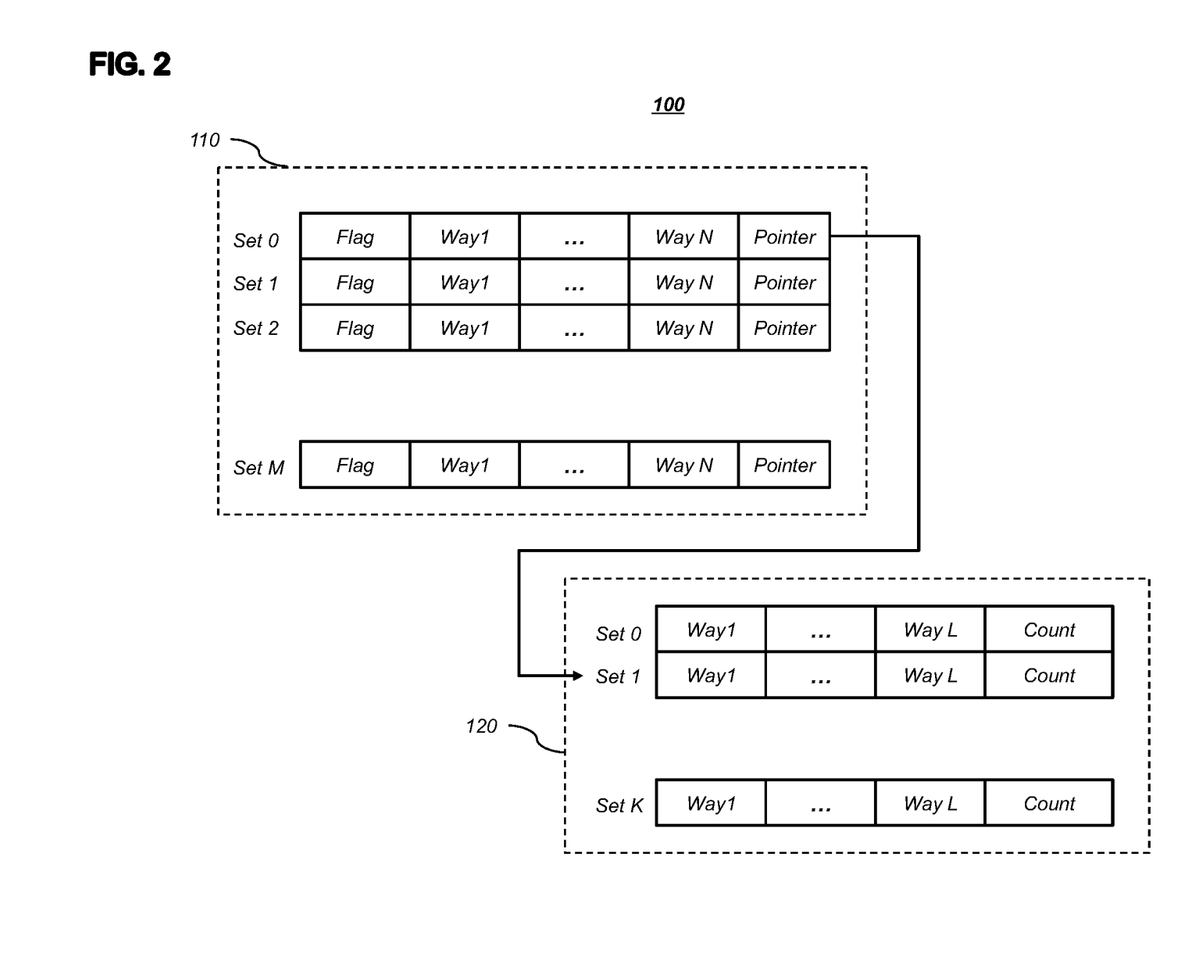
FIG. 2 is a block diagram representation of the cache device in accordance with an embodiment.

FIG. 2 is a block diagram representation of the cache device 100 in accordance with an embodiment.

The cache device 100 in accordance with an embodiment may include the first and second caches 110 and 120.

Each of the first and second caches 110 and 120 may include a plurality of sets. Each of the sets may include a plurality of ways.

Figure 3:
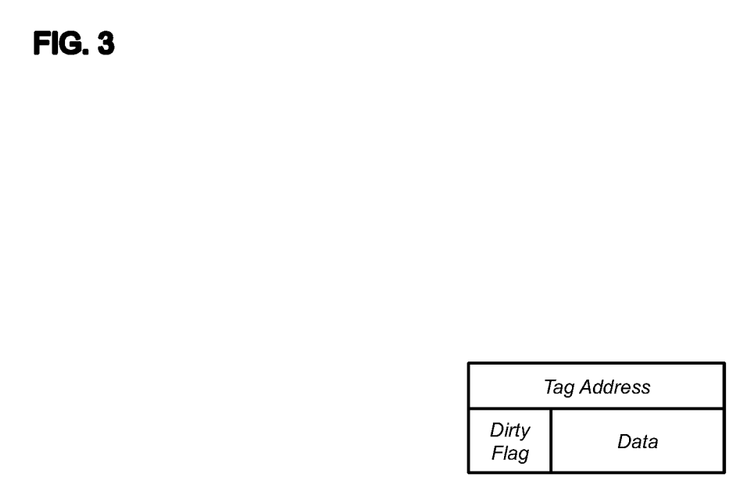
FIG. 3 is a diagram illustrating a representation of the way data structure of the cache device in accordance with an embodiment.

Which set of the first cache 110 to use may be automatically determined according to an address requested from the processor core 10 (see FIG. 1). As illustrated in FIG. 3, each of the ways may include a tag address, a dirty flag, and data therein.

The address requested from the processor core 10 may be generated with a combination of a set number and a tag address. Thus, the tag addresses of the plurality of ways included in the set which is automatically determined by the requested address may be searched in order to check whether the value of the address requested from the processor core 10 is stored in the cache device 100. Furthermore, a specific value (for example, "0") may be designated for a tag address so as to indicate that the corresponding way is vacant.

The dirty flag indicates whether data stored in the cache device is stored in the storage device 30 (see FIG. 1). For example, the activated dirty flag may indicate that data stored in the corresponding way was updated but not stored in the storage device 30. Thus, when the dirty flag of a way evicted from the cache device is activated, data stored in the way may be used to update the storage device 30.

The second cache 120 may include a plurality of sets. Each of the sets may be related with any one of the sets included in the first cache 110. The relations among the sets included in the first cache 110 and the sets included in the second cache 120 may be frequently changed.

When a specific set of the first cache 110 (for example, set 0) has no vacant ways, the corresponding set may be related with any one of available sets of the second cache 120 (for example, set 1). Through this operation, the number of ways included in the set 0 of the first cache may be expanded to (N+L) from N (where N is a natural number).

Among the sets of the second cache 120, a set having no relation with any set of the first cache 110 may be related with a set of the first cache 110.

Among the sets of the second cache 120, a set having a low use frequency may also be related with a set of the first cache 110. For this operation, the second cache 120 may include a count for each of the sets. The count may indicate information on the frequency of requests, such as read or write requests, for the corresponding set.

For example, the count may be controlled to increase whenever a read or write operation is performed on the corresponding set, and decrease at each predetermined period.

When the count has a specific value (for example, 0), the corresponding set may be determined to have a low use frequency, and related with another set of the first cache 110, instead of the currently related set of the first cache 110.

Each set of the first cache 110 may include a flag. The flag may indicate whether the corresponding set has relation with any one of the sets of the second cache 120. Each set of the first cache 110 may include a pointer indicating the set of the second cache 120 which has relation with the corresponding set.

Thus, when a read or write request is made from the processor core 10 (see FIG. 1), the storage space of the second cache 120 may be used as well through the flag and pointer included in the set of the first cache 110, which is automatically determined from the corresponding address.

A method for processing a read or write request for the cache 100 through the cache controller 200 illustrated in FIG. 2 will be described in detail with reference to FIGS. 4 to 5.

Figure 4:
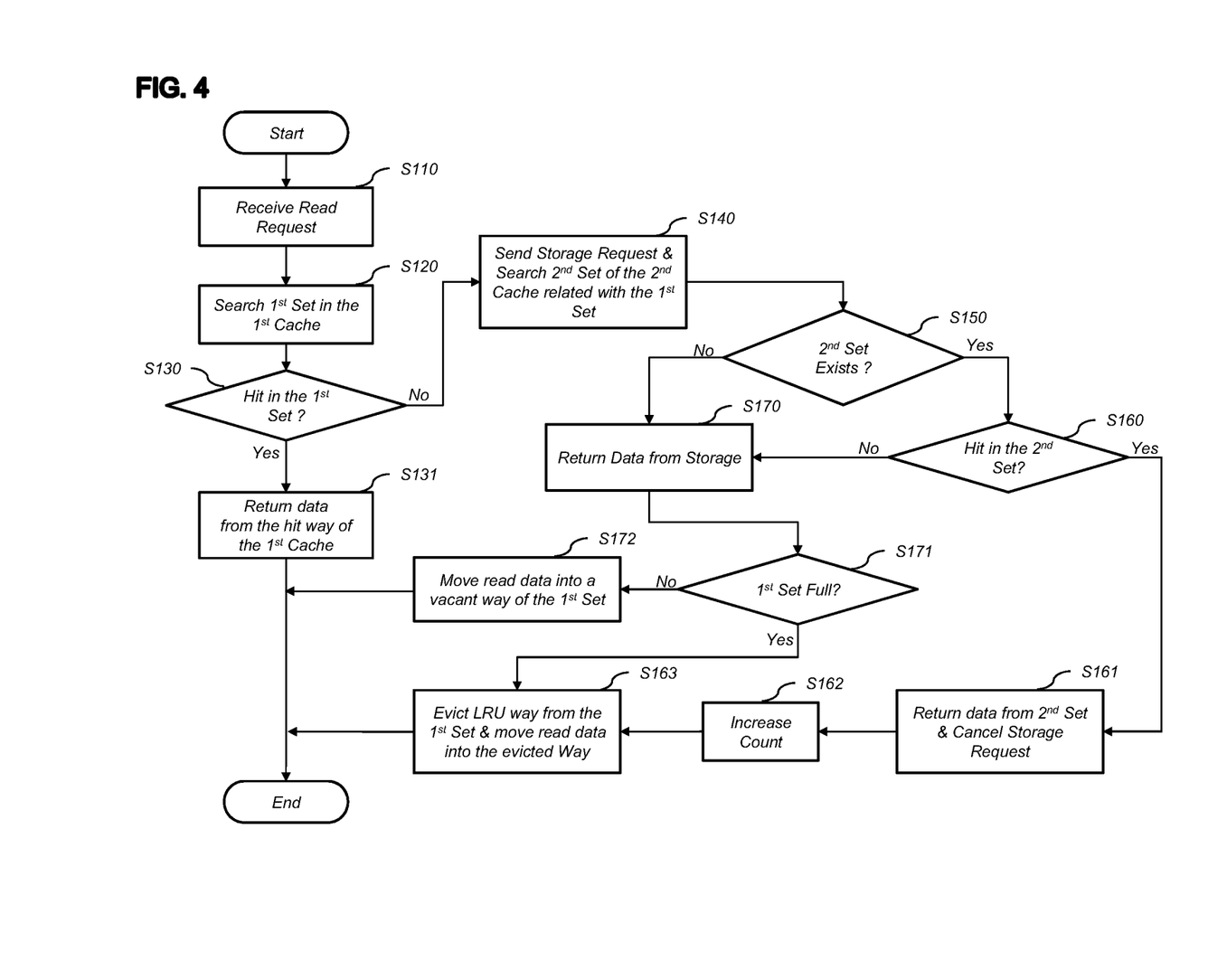
FIG. 4 is a flowchart illustrating a representation of a read operation for the cache device in accordance with an embodiment.

FIG. 4 is a flowchart illustrating a representation of a read operation for the cache device in accordance with an embodiment.

First, the cache controller 200 (see FIG. 1) may receive a read request from the processor core 10 at step S110.

The cache controller 200 may search a first set in the first cache 110, using an address corresponding to the read request (hereafter, read request address) at step S120. The first set of the first cache 110 may be automatically designated by the read request address.

The cache controller 200 may compare the tag addresses of the plurality of ways included in the first set to the read request address, and determine whether there exists a first way corresponding to the read request address, at step S130 (i.e., Hit in the $1^{st}$ Set?).

When the first way exists (i.e., Yes), the cache controller 200 may read data from the corresponding way, provide the read data to the processor core 10, and end the process.

When it is determined at step S130 that the first way does not exist (i.e., No), the cache controller 200 may send a read request for the storage device 30 to the storage controller 20 (see FIG. 1). Then, the cache controller 200 may check whether a second set related with the first set of the first cache 110 exists in the second cache 120, at steps S140 and S150. Whether there exists the second set related with the first set may be checked through the flag of the first set, and the address of the second set related with the first set may be checked through the pointer of the first set.

When the second set exists (i.e., Yes), the cache controller 200 may check whether there exists a second way corresponding to the read request address, among the plurality of ways included in the second set, at step S160 (i.e., Hit in the $2^{nd}$ Set).

When the second way exists (i.e., Yes), the cache controller 200 may send data of the second way to the processor core 10. Furthermore, since the process for the read request was completed by the cache device 100, the read request transmitted from the storage controller 20 does not need to be executed. Thus, the cache controller 200 may provide a cancellation request for the read request sent at step S161 to the storage controller 20.

Then, the cache controller 200 may increase a count at step S162 corresponding to the second set of the second cache 120.

Among all the ways included in the first set of the first cache 110 and the second set related with the first set, the most recently accessed way may be stored in the first set. However, since the first set has no vacant ways, any one of the plurality of ways included in the first set may be evicted. In an embodiment, the least recently used way is selected as an evicted way. When the way is evicted, the dirty flag of the way may be checked. In these cases, when the dirty flag is activated, the data of the way may be stored in the storage device 30. Then, the data provided to the processor core 10 may be stored in a vacant way of the first set at step S163.

In an embodiment, the way of the first set is evicted to the storage device 30 at step S163. In an embodiment, however, the way evicted from the first set may be stored in a vacant way of the second set.

When it is determined at step S150 that the second set does not exist (i.e., No), the cache controller 200 may read data from the storage device 30 and provide the read data to the processor core 10, without determining whether the second way exists in the second set, at step S170.

Then, the cache controller 200 may check whether the first set has a vacant way, at step S171 (i.e., $1^{st}$ Set Full?). When the first set has a vacant way (i.e., No, the $1^{st}$ set is not full), the cache controller 200 may store the data read from the storage device 30 in the vacant way of the first set at step S172, and then end the process.

When the first set has no vacant set (i.e., Yes, the $1^{st}$ set is full), the cache controller 200 may evict the least recently used way from the first set of the first cache 110, and may store the data read from the storage device 30 in the vacant way of the first set at step S163.

When it is determined at step S160 that the second way corresponding to the read request address does not exist in the second set (i.e., No), the cache controller 200 may provide the data read from the storage device 30 to the processor core 10.

In these cases, since the first set has no vacant way, the cache controller 200 may evict the least recently used way from the first set, and store the data read from the storage device 30 in the vacant way of the first set, at step S163. In an embodiment, the way evicted from the first set may be moved to a vacant way of the second set.

When the cache device 100 in accordance with an embodiment is used to process a read request, the lack of way caused by concentration of read requests for a specific set of the first cache 110 may be made up for through the second cache 120. Thus, the cache device 100 may prevent performance degradation associated with frequent evictions.

Figure 5:
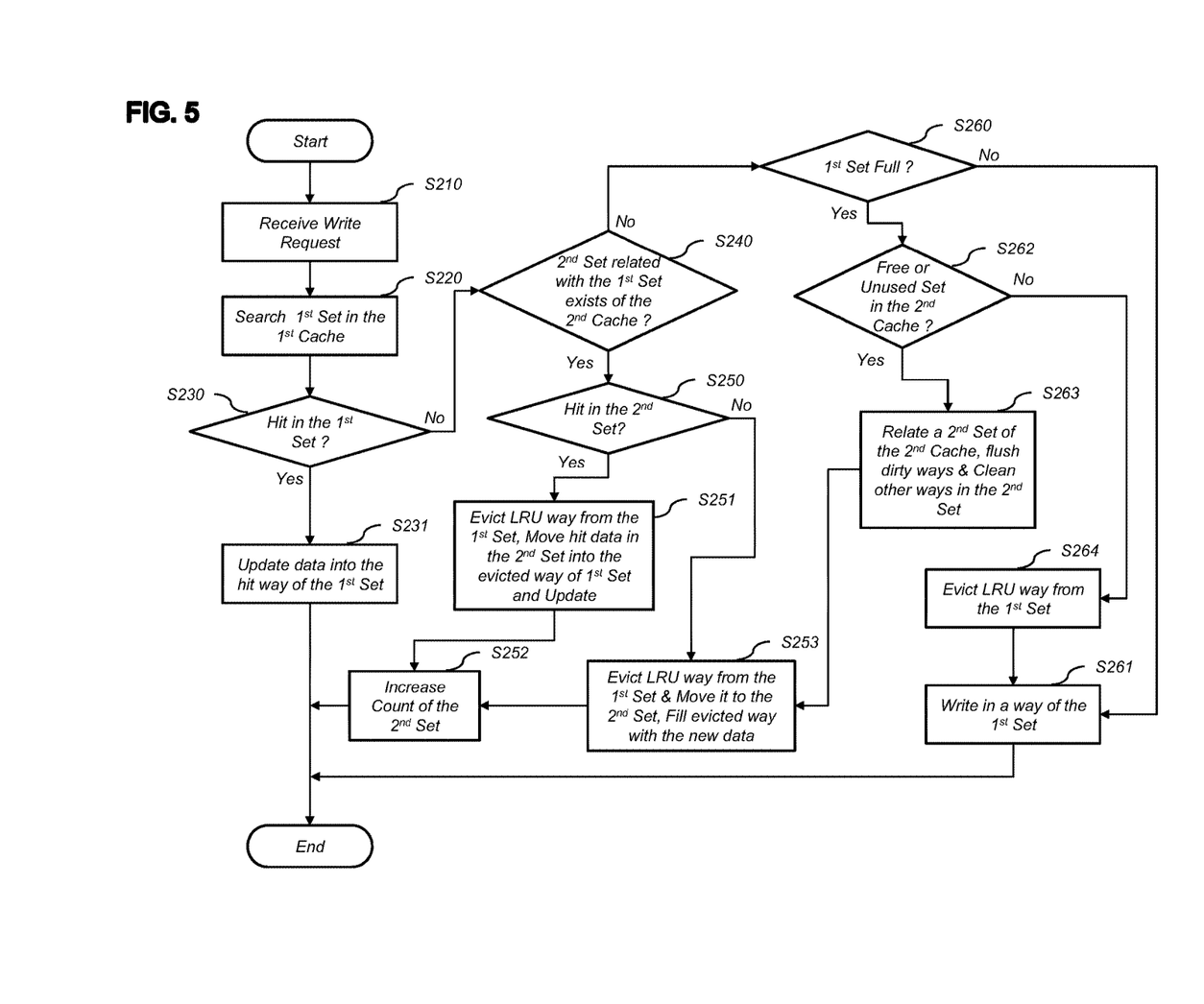
FIG. 5 is a flowchart illustrating a representation of a write operation of the cache device in accordance with an embodiment.

FIG. 5 is a flowchart illustrating a representation of a write operation of the cache device 100 in accordance with an embodiment.

First, the cache controller 200 (see FIG. 1) may receive a write request from the processor core 10 at step S210.

At step S220, the cache controller 200 may search a first set in the first cache 110, using an address corresponding to the write request (hereafter, referred to as a write request address). The first set of the first cache 110 may be automatically designated by the write request address.

Then, at step S230, the cache controller 200 may check whether a first way corresponding to the write request address exists in the first set (i.e., Hit in the $1^{st}$ Set?).

When the first way exists (i.e., Yes), the cache controller 200 may store data corresponding to the write request (hereafter, referred to as write request data) in the first way. Furthermore, the cache controller 200 may activate the dirty flag of the first way. Then, at step S231, when the corresponding way is evicted in the future, the cache controller 200 may update the data into the storage data 30 (i.e., Update data into the hit way of the $1^{st}$ Set).

When the first way does not exist (i.e., No), the cache controller 200 may check whether a second set related with the first set exists in the second cache 120, at step S240. Whether the second set related with the first set exists may be checked through the flag of the first set, and the address of the second set related with the first set may be checked through the pointer of the first set.

When the second set exists (i.e., Yes), the cache controller 200 may check whether a second way corresponding to the write request address is included in the second set, at step S250 (i.e., Hit in the $2^{nd}$ Set?). This operation may be performed by comparing the tag addresses of the ways included in the second set to the write request address.

When the second way corresponding to the write request address exists in the second set (i.e., Yes), the cache controller 200 may evict the least recently used (LRU) way from the first set to the storage device 30. Then, at step S251, the cache controller 200 may move the second way of the second set into the vacant way of the first set, and update the data using the write request data.

In an embodiment, the least recently used way may be evicted from the first set to the storage device 30. In an embodiment, however, the least recently used way may be moved into a vacant way of the second set.

Then, at step S252, the cache controller 200 may increase the count of the second set.

When it is determined at step S250 that the second way corresponding to the write request address does not exist (i.e., No), the cache controller 200 may evict the least recently used way from the first set to a vacant way of the second set. Furthermore, at step S253, the cache controller 200 may move the second way of the second set into a vacant way of the first set, and update the data using the write request data.

When the second set has no vacant way, the way evicted from the first set may be moved into the storage device 30.

Then, at step S252, the cache controller 200 may increase the count of the second set.

When it is determined at step S240 that the second set related with the first set does not exist (i.e., No), the cache controller 200 may check whether the first set has a vacant way. This check may be performed at step S260 (i.e., $1^{st}$ Set Full?).

When the first set has a vacant way (i.e., No), the cache controller 200 may store the write request data in the vacant way at step S261 (i.e., Write in a way of the $1^{st}$ Set).

When the first set has no vacant way, the cache controller 200 may check whether a third set which may be related with the first set exists in the second cache 120, at step S262.

The third set which may be related with the first set may include a set which is not related with any sets of the first cache 110 or a set which is related with any one set of the first cache 110 but includes a count having a specific value (for example, 0).

When the third set exists (i.e., Yes), the cache controller 200 may relate the third set with the first set. At this time, the cache controller 200 may activate the flag of the first set and write the address of the third set into the pointer of the first set.

When the third set had been related with another set of the first cache 110, the cache controller 200 must first evict ways which are not vacant, among the ways included in the third set. When the ways are evicted, data of ways of which the dirty flags are activated may be rewritten to the storage device 30 at step S263.

Then, the cache controller 200 may evict the least recently used way from the first set, and move the evicted way into a vacant way of the third set. Then, at step S253, the cache controller 200 may write the write request data into the vacant way of the first set.

Then, at step S252, the cache controller 200 may increase the count of the third set.

When it is determined at step S262 that the third set which may be related with the first set does not exist in the second cache 120 (i.e., No), the cache controller 200 may evict the least recently used way from the first set at step S264.

Then, the cache controller 200 may store the write request data in the vacant way of the first set, and end the process.

Figure 6:
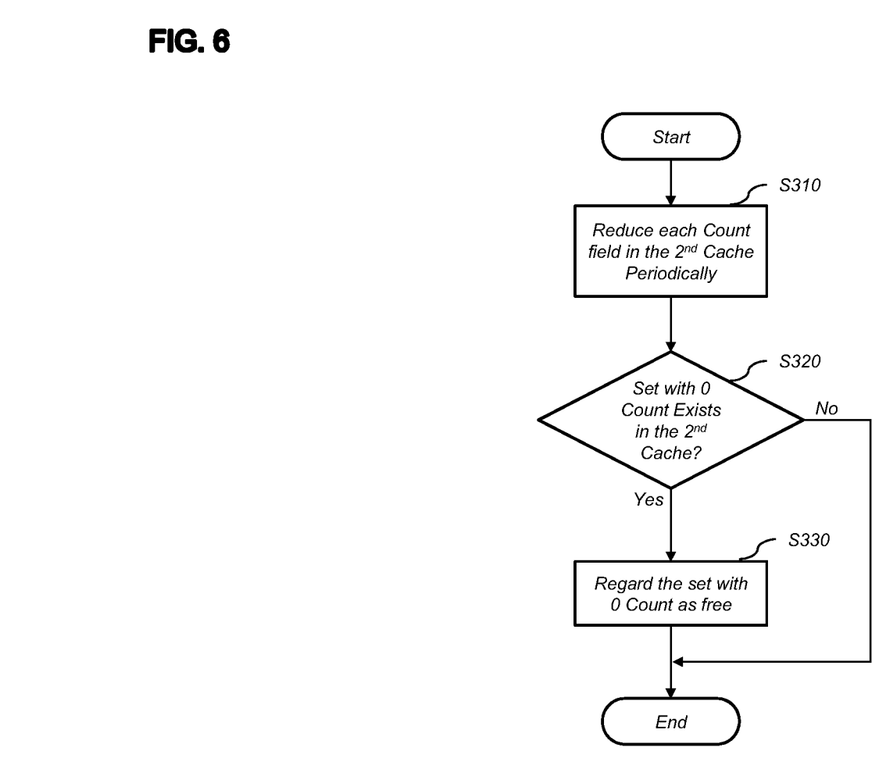
FIG. 6 is a flowchart illustrating a representation of a method for controlling the count of a second cache in the cache device in accordance with an embodiment.

FIG. 6 is a flowchart illustrating a representation of a method for controlling the count of the second cache in the cache device in accordance with an embodiment.

As described above, the count of the second cache 120 exists in each set of the second cache 120. The count is increased, when the second set is accessed to process a read or write request.

The cache controller 200 may decrease the count positioned in each set of the second cache 120 at each predetermined period at step S310. At this time, the period and the decrease may differ depending on the embodiments.

The cache controller 200 may consider a set in the second cache, of which the count is, for example, 0, as a set which may be related with the sets included in the first cache. This has been described in detail in relation with step S262 of FIG. 5.

As the count is decreased, a set which is less used in the second cache 120 may be used to expand the ways of a set having high use frequency in the first cache 110. Through this operation, the size of the first cache 110 may be dynamically controlled while the size of the second cache 120 is not significantly increased.

As such, at step S320, the check is performed by setting the count for example with 0 and determining whether a set with the count exists in the $2^{nd}$ cache. If yes, then at step S330, the set with a zero count is regarded as free or available.

In accordance with the embodiments, the cache device may increase a storage space for an address on which requests are concentrated, thereby improving the operating performance of the cache device.

Although various embodiments have been described for illustrative purposes, it will be apparent to those skilled in the art that various changes and modifications may be made without departing from the spirit and scope of the invention as defined in the following claims.

What is claimed is:

1. A control method of a cache device, comprising:
   checking whether a first way corresponding to a write request address exists in a first set of a first cache;
   checking whether a second set related with the first set exists in a second cache by checking a flag and a pointer of the first set, when the first way does not exist;
   checking whether a second way corresponding to the write request address exists in the second set, when the second set exists; and
   storing the write request data, when the second way exists,
   wherein when the related second set does not exist:
   checking whether the first set has a vacant way;
   wherein when the first set has no vacant way:
   checking whether there exists a third set in the second cache by checking a flag and a pointer of any set of the first cache and a count of any set of the second cache, the third set being a set which is not related with any set of the first cache or a set having a count with a specific value;
   relating the third set with the first set, when the third set exists;
   moving any one way of the first set into the third set; and
   storing the write request data into the vacant way of the first set.

2. The control method of claim 1, wherein the storing of the write request data comprises:
   evicting any one way included in the first set; and
   storing the write request data into the vacant way of the first set.

3. The control method of claim 1, wherein the storing of the write request data comprises:
   moving any one way included in the first set into a vacant way of the second set; and
   storing the write request data into the vacant way of the first set.

4. The control method of claim 1, wherein when the second way does not exist
   moving any one way included in the first set into the second set; and
   storing the write request data into a vacant way of the first set.

5. The control method of claim 1, wherein when the related second set does not exist:
   storing the write request data into the vacant way, when the first set has the vacant way.

6. The control method of claim 1, wherein when the set having the count with the specific value in the second cache is selected as the third set:
   evicting a way of which a dirty flag is activated, among ways included in the third set, into a storage device; and
   setting all the ways included in the third set to vacant ways.

* * * * *